United States Patent [19]

Shinoda

[11] Patent Number: 5,680,322
[45] Date of Patent: Oct. 21, 1997

[54] METHOD AND APPARATUS FOR DYNAMIC IMAGE DATA TRANSMISSION

[75] Inventor: Mayumi Shinoda, Hirakata, Japan

[73] Assignee: Matsushita Electric Industrial Co., Ltd., Osaka, Japan

[21] Appl. No.: 451,470

[22] Filed: May 26, 1995

[30] Foreign Application Priority Data

May 30, 1994 [JP] Japan .................... 6-116876

[51] Int. Cl.⁶ .................... G11B 7/007; G06F 11/00
[52] U.S. Cl. .................... 364/514 A; 371/32
[58] Field of Search .................... 364/514 A, 514 R; 371/31, 32, 34, 35; 395/182.16; 370/118, 468, 477

[56] References Cited

U.S. PATENT DOCUMENTS

| | | | |
|---|---|---|---|
| 4,622,682 | 11/1986 | Kumakura | 371/32 |
| 4,939,731 | 7/1990 | Reed et al. | 371/32 |
| 5,031,179 | 7/1991 | Yoshida et al. | 371/32 |
| 5,077,742 | 12/1991 | Tsumura et al. | 371/32 |
| 5,150,368 | 9/1992 | Autruong et al. | 371/31 |
| 5,422,893 | 6/1995 | Gregg et al. | 371/32 |
| 5,463,565 | 10/1995 | Cookson et al. | 364/514 R |
| 5,506,958 | 4/1996 | Myran | 395/182.16 |
| 5,537,416 | 7/1996 | MacDonald et al. | 371/32 |

*Primary Examiner*—Hassan Kizou
*Assistant Examiner*—Kwang Bin Yao
*Attorney, Agent, or Firm*—Wenderoth, Lind & Ponack

[57] ABSTRACT

A Method and apparatus for the transmission of dynamic image data which performs retransmissions when an error occurs in teh transmitted data. A transmitting side codes inputted dynamic image data and further error-correcting or detecting codes the data, and then transmits the data to a receiving side. The receiving side corrects or detects errors in the received image code bit string and makes a determination as to whether there exists any uncorrectable errors. If there is an uncorrectable error, it makes a determination as to whether the effect of the error on the picture or image quality is larger or smaller than a predetermined criterion. If it determines it is larger, it transmits a retransmission request to the transmitting side, and if smaller, it does not transmit a retransmission request. When transmitting dynamic image data coded by the MPEG format, transmission is made with B pictures thinned out based upon a transmission rate. Furthermore, an I picture is coded as a P picture which refers to a P picture present immediately before it and only the first transmission frame is transmitted as an I picture and the middle frames are transmitted as frames coded as P pictures.

13 Claims, 16 Drawing Sheets

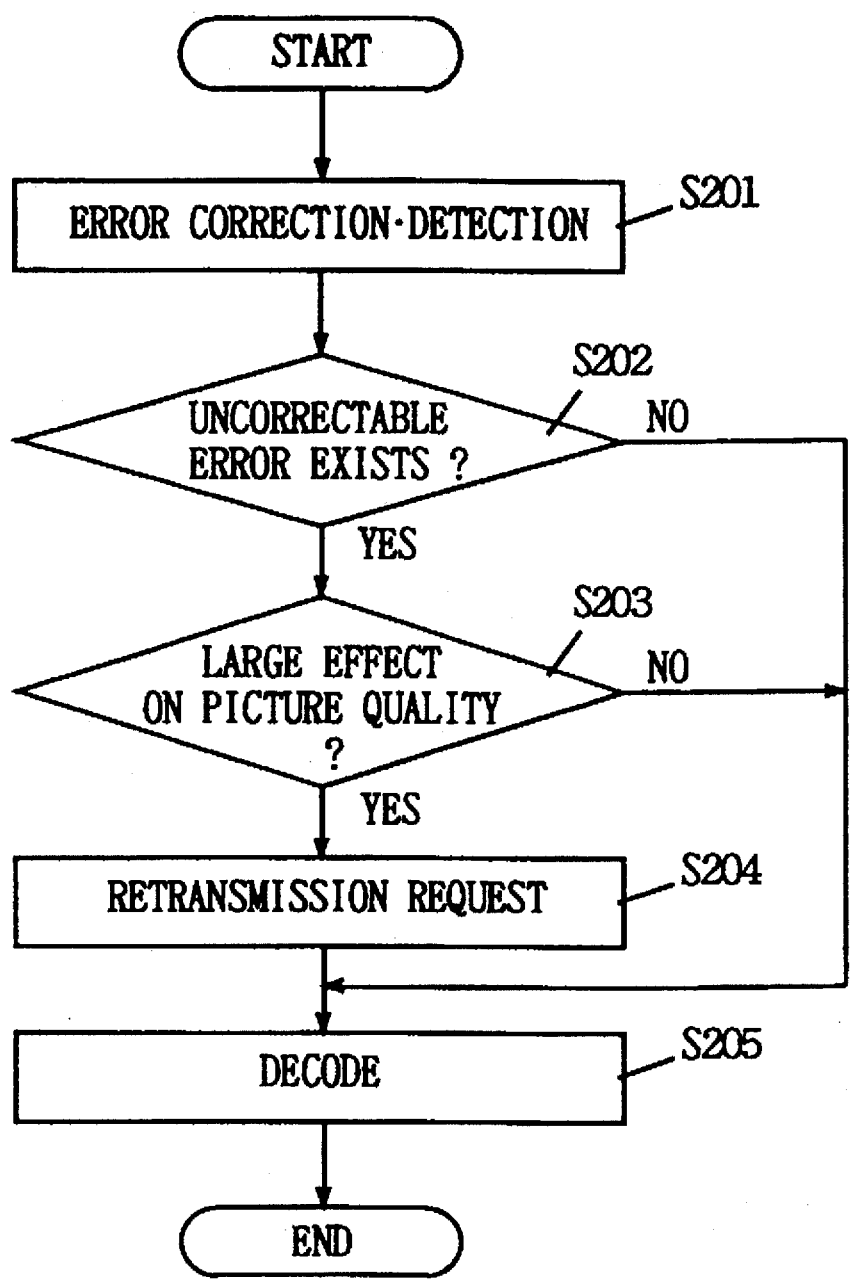

▨ PORTION THAT CAN NOT BE DECODED CORRECTLY BECAUSE OF ERROR

METHOD AND APPARATUS FOR DYNAMIC IMAGE DATA TRANSMISSION

BACKGROUND OF THE INVENTION

1. Field of the Invention

The present invention relates to a method and apparatus for the transmission of dynamic image data, and particularly to a method and apparatus for transmitting image data which performs retransmission when an error occurs in the transmitted data.

2. Description of the Background Art

In instances where image data is highly compressed, the effect upon the picture quality is extensive if a transmission error occurs. For example, data which is coded according to the Huffman coding, which is one of the variable-length codings often used to compress image data, have irregular lengths of codes. Accordingly, even one bit of error occurring in the middle of the coded data will cause parts of subsequent codes to be lost, and the data can not be decoded correctly until the next synchronization code (unique word) appears. In compression of the dynamic image data, the correlation among frames is often utilized to code differences among the frames, and thus deterioration in the picture or image quality in a specific frame often affects other frames which refer to the specific frame.

Accordingly, error correcting codes are applied to the transmission data in many cases. If an error occurs which can not be corrected with the error correcting code, the effects of that error, even for errors of only one bit, extend in space and time because of the reason mentioned above and thus the quality of the decoded picture or image becomes very bad.

Hence, a method of transmitting high quality image data by retransmitting data blocks with uncorrected errors is adopted in the digital cordless video telephone by the BT Laboratories in England. This method of transmitting image data will be described in detail below.

The transmitting side has a function of compression-coding image signals, error-correcting coding and transmitting the same, and retransmitting data for which a retransmission request is transmitted. On the receiving side, as shown in the flow chart of FIG. 18, errors in a received image coded bit string are corrected or detected (step S101), and a determination is made as to whether there are uncorrectable errors present (step S102). If so, a retransmission request is then transmitted to the transmitting side (step S103), and an image coded bit string including the retransmitted data is decoded (step S104).

According to such conventional image data transmission techniques as described above, the retransmission request transmitted for all the data blocks containing errors which can not be corrected, such that the data blocks are retransmitted until the errors are correctly received even if the effects of the corrupted data upon the picture or image quality are very small. As a result, there exits the problem of a decrease in the transmission efficiency of the image data. This is especially true in the transmission of MPEG data (Motion Picture Experts Group), which is one of the image data compression coding methods, because the I picture which appears at intervals to enable random access or high-speed reproduction has a very large number of bits, such that making retransmission of all data with uncorrected errors considerably deteriorates the transmission efficiency. The MPEG format is a compression/expansion method determined jointly by the ISO (International Organization for Standardization) and the IEC (International Electrotechnical Commission), which is officially named ISO/IEC CD 1172 "Paris Format".

In conventional image data transmission systems, compression-coded image data is once stored in a storage device, such as an optical disc on the transmitting side, and is read from the storage device to be transmitted to the receiving side. However, if the transmission rate is deteriorated for some reason and the image data must be transmitted at a rate lower than that realized at the time of coding, all the image data can not be transmitted before the time required to display the image on the receiving side if all the image data stored in the storage device is transmitted as it exists. Accordingly, in the conventional image data transmission systems, the transmitting side is configured to have a recoding/decoding function as shown in FIG. 19. That is to say, the image coded bit string coded in an image coding device 121 and stored in a storage device 122 is once decoded in an image decoding device 123. Subsequently, the decoded data is recoded by an image coding device 124 with a compression ratio corresponding to a transmission rate and transmitted to the receiving side by a transmitting device 125. As described above, conventional image data transmission systems have the common disadvantage of a very complicated transmitting side.

SUMMARY OF THE INVENTION

An object of the present invention is to provide a method and apparatus for transmitting dynamic picture image data which minimizes deterioration in the picture quality without degrading the transmission efficiency.

Another object of the present invention is to provide an apparatus for transmitting dynamic image data which is capable of transmitting image data that has already been coded according to the MPEG format at a transmission rate realized at the time of coding or lower without decoding and coding again.

Still another object of the present invention is to provide an apparatus for transmitting dynamic image data which is capable of reducing the number of bits of I pictures appearing everywhere in the dynamic image data coded according to the MPEG format when transmitting the same.

A first aspect of the present invention is directed to a method for transmitting compression-coded dynamic image data from a transmitting side to a receiving side. In this method, the transmitting side compression-codes dynamic image signals to generate an image coded bit string, and then applies error correcting coding or error detecting coding to the image coded bit string and transmits the same to the receiving side. The receiving side corrects or detects errors in the received transmission bit string and determines whether the effect of the detected error upon the picture or image quality is larger than a predetermined criterion. As a result of the determination, if the effect upon the picture or image quality is larger than the predetermined criterion, a retransmission request for the data containing errors in the image coded but string is transmitted to the transmitting side. When a retransmission request is transmitted from the receiving side, the transmitting side retransmits the data according to the retransmission request to the receiving side. The receiving side decodes the image coded bit string including the retransmitted data into an image. Thus, retransmission is made not for all of the data blocks with detected errors but only for data blocks including errors determined to have large effects on the picture or image quality, so that the deterioration in the picture or image quality can be minimized without degrading the transmission efficiency.

A determination as to whether the effect of the detected error on the picture or image quality is large or not may be made depending on whether the image frame including the detected error is referred to when other image frames are decoded or not. That is to say, if the effect of the error on the picture or image quality stays only within that frame and does not extend in time, prevention of deterioration in the transmission efficiency has priority and retransmission of the image data in the error portion is not requested. On the other hand, if the effect of the detected error on the picture or image quality spreads to other frames and extends in time, a request is transmitted for retransmission of the image data containing errors to prevent the deterioration in the picture or image quality from extending to other frames.

When the transmitting side compression-codes dynamic image signals according to the MPEG format and transmits the same, the receiving side may control the retransmission request to the transmitting side on the basis of the particular picture type (I picture, P picture, B picture) in the MPEG format in which the detected error exists. That is to say, since the B picture in the MPEG format is not referred to when decoding other frames, retransmission is not transmitted for errors occurring in the B picture, i.e., the errors which do not extend in time to prevent deterioration in the transmission efficiency. On the other hand, since the I pictures and the P pictures are referred to when decoding other frames, retransmission is made for errors occurring in those pictures, i.e., errors spreading in time to suppress deterioration in the picture quality.

The image portion which can not be correctly decoded because a request was not transmitted for retransmission of data containing errors may be replaced by corresponding portion of another image frame preceding it by one in time, or the entire image frame may be abandoned and replaced by the image frame preceding by one in time. In this way, the correlation of images among frames can be utilized to prevent the image quality from becoming very bad.

When dynamic image signals are compression-coded using a coding method in which an error occurring in a certain bit will cause subsequent bits to be erroneously decoded (Huffman coding, for example), it is also possible to retransmit data blocks containing errors if the number of bits from the bit with the detected error to the next synchronization code is large, and on the other hand, to not retransmit data blocks containing errors if the number of bits is small. That is to say, if the amount of information before the next synchronization code which can not be decoded due to the error is small, a difference from a reference frame is small, so that inserting the reference frame into the portion which can not be correctly decoded will not cause considerable deterioration in the picture or image quality. Accordingly, the data blocks containing errors are not retransmitted. If the amount of information from the error to the next synchronization code is large, the difference from the reference frame is large and the lack of information causes considerable deterioration in the picture or image quality. Accordingly, data blocks containing such errors are retransmitted.

A second aspect of the present invention is directed to a system for transmitting compression-coded dynamic image data from a transmitting side to a receiving side. In this system, the transmitting side compression-codes the dynamic image signal according to the MPEG format to generate an image coded bit string. Then, the image coded bit string is divided into data blocks and is error-correcting coded or error-detecting coded. The image coded bit string is transmitted to the receiving side. The receiving side corrects or detects errors of the received image coded bit string for each data block. Then, it determines the type of picture corresponding to the bit with the detected error. If the determined picture is an I picture or a P picture in the MPEG format, it sends a retransmission request to the transmitting side. Furthermore, the receiving side buffers subsequent received data blocks from a time when the retransmission request is transmitted until the time when the data block containing errors is retransmitted. Then, it decodes the image coded bit string, including the retransmitted data block, into an image.

A third aspect of the present invention is directed to a system for transmitting compression-coded dynamic image data from a transmitting side to a receiving side. In this system, the transmitting side compression-codes dynamic image signals using a coding method in which an error occurring in a certain bit causes the receiving side to erroneously decode subsequent bits (the Huffman coding method, for example) to generate an image coded bit string. Then, the image coded bit string is divided into data blocks and is subjected to the error correcting coding or error detecting coding. The image coded bit string is transmitted to the receiving side. The receiving side corrects or detects errors in the received image coded bit string for each data block. Then, it counts the number of bits from the bit with the detected error to the next synchronization code and transmits a retransmission request to the transmitting side if the number of the counted bits is larger than a predetermined threshold value. Further, the receiving side buffers subsequent received data blocks from a time when the retransmission request is made until the time when the error data block is retransmitted. Then, it decodes the image coded bit string, including the retransmitted data block, into an image. At this time, the image portion which can not be correctly decoded because a retransmission request was not transmitted for the data block containing errors is replaced by an image in the same position of a reference frame.

A fourth aspect of the present invention is directed to an apparatus for transmitting compression-coded dynamic image data to a receiving side. This apparatus codes dynamic image signals according to the MPEG format to generate an image coded bit string. The generated image coded bit string is once stored and is then read with the B pictures in the MPEG format thinned out according to a required transmission rate. The read image coded bit string is transmitted to the receiving side. Now, since the B pictures in the MPEG format are not referred to when decoding other frames, thinning them out does not affect other frames. Accordingly, transmission with the B pictures thinned out eliminates the procedures of re-decoding and coding and thus enables data transmission at or below a transmission rate realized at the time of coding.

A fifth aspect of the present invention is directed to an apparatus for transmitting compression-coded dynamic image data to a receiving side. This apparatus codes dynamic image signals according to the MPEG format to generate an image coded bit string. Upon generating an image coded bit string, it further codes an image frame coded as an I picture also as a P picture which refers to an I picture or a P picture immediately before it in time. Each generated image coded bit string is once stored. Then, when a random access request is made from the receiving side, an access point is retrieved from the stored data and the image coded bit string of each frame is read sequentially starting from the I picture located first in time after the access point and then the image coded bit string the ransmitted to the receiving side. As to the I pictures located in the middle, the ones coded as P pictures of the same frames are read and transmitted to the receiving side. In this way, as the image frames conventionally transmitted with the I pictures are transmitted with the P pictures, the number of transmission bits are considerably reduced to enhance the transmission efficiency.

A sixth aspect of the present invention is directed to an apparatus for transmitting compression-coded dynamic image data to a receiving side. This apparatus codes dynamic image signals according to the MPEG format to generate an image coded bit string. Upon generating an image coded bit string, each frame is coded as either a P picture or a B picture except the first image frame and image frames immediately after scene changes. Further, image frames coded as P pictures at appropriate positions are coded also as I pictures. Each generated image coded bit string is once stored. When a random access request is made from the receiving side, an access point is retrieved from the stored data and the image coded bit string of each image frame is read sequentially starting from the I picture located first in time after the access point and then the image coded bit string is transmitted to the receiving side. In this way, as the image frame conventionally transmitted with the I picture is transmitted with the P picture, the number of transmission bits can be substantially decreased resulting in an increase of the transmission efficiency. Also, only the error corresponding to the first frame remains and subsequent errors are not accumulated, therefore data transmission with small error is achieved.

A seventh aspect of the present invention is directed to an apparatus for transmitting compression-coded dynamic image data to a receiving side. This apparatus codes dynamic image signals according to the MPEG format to generate an image coded bit string. Upon generating an image coded bit string, an image frame coded as an I picture is also coded as a P picture which refers to an image frame coded as an I picture immediately before it in time. Each generated image coded bit string is once stored. When a high-speed reproduction is requested from the receiving side, an access point is retrieved from the stored data and the I picture located first in time after the access point is read. Next, only the image frames coded as I pictures are retrieved, and the data coded as P pictures which refer to I pictures immediately before the image frames are read as to the retrieved image frames. Each image coded bit string is transmitted to the receiving side. As described above, as the image frames conventionally transmitted with the I pictures are transmitted with the P pictures, the number of transmission bits can be considerably reduced to enable reproduction at higher speeds.

An eighth aspect of the present invention is directed to an apparatus for transmitting compression-coded dynamic image data to a receiving side. This apparatus codes dynamic image signals according to the MPEG format to generate an image coded bit string. Upon generating an image coded bit string, an image frame coded as an I picture is also coded as a P picture which refers to an image frame coded as an I picture immediately after it in time. Each generated image coded bit string is once stored. When a reverse reproduction request is made from the receiving side, an access point is retrieved from the stored data and the I picture located first in time after the access point is read. Next, the stored data is read in the reverse order from the GOP unit in the MPEG. At this time, as to an image frame coded as an I picture, the data coded as a P picture which refers to an I picture immediately after that image frame is read. Each image coded bit string is transmitted to the receiving side. As described above, since the image frames conventionally transmitted with the I pictures are transmitted with the P pictures, the number of transmission bits are considerably reduced to enhance the transmission efficiency.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a flow chart describing the first embodiment of the present invention.

DESCRIPTION OF THE PREFERRED EMBODIMENTS (1) First Embodiment

First, an image data transmission system according to the first embodiment of the present invention will be described.

In this embodiment, the transmitting side performs compression coding according to a method such as the CCITT recommendation H.261, MPEG, etc. to inputted picture or image signals and performs the error correcting coding such as the BCH coding etc. to the same, and then transmits the same to the receiving side in the form of an image coded bit string. The transmitting side has a function of retransmitting data for which a retransmission request is transmitted from the receiving side.

The receiving side performs operations as shown in the flow chart of FIG. 1. First, it corrects or detects errors in the received image coded bit string (step S201) and makes a determination as to whether there are any errors which can not be corrected (step S202). If there are no uncorrectable errors, it decodes the received image coded bit string as it exists (step S205). If there are any uncorrectable errors, it makes a determination as to whether the effect of the errors upon the picture quality is larger or smaller than a predetermined criterion (step S203). When the effect is smaller than the criterion, it decodes the received image coded bit string as it exists (step S20S). On the other hand, if the effect is larger than the criterion, it transmits a request for retransmission to the transmitting side (step S204), and decodes the retransmitted image coded bit string (step S205).

(2) Second Embodiment

Figure 3:
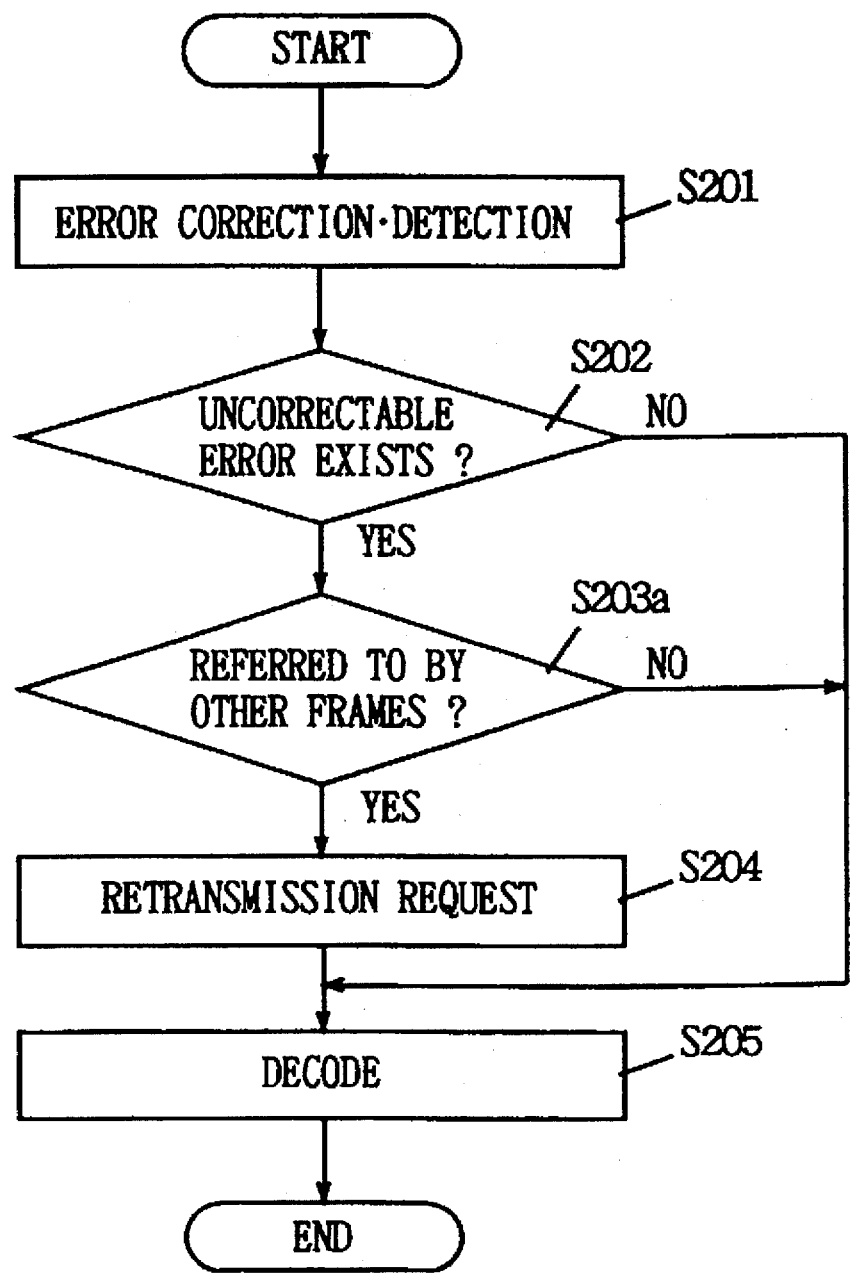
FIG. 3 is a flow chart describing the second embodiment of the present invention.

In the second embodiment of the present invention, as shown in the flow chart of FIG. 3, the determination as to whether the effect of the error upon the picture or image quality is large or small as shown in step S203 of FIG. 1 is made on the basis as to whether the frame with that error is referred to when other frames are decoded (step S203a). Thus, it is determined that an error occurring in a frame that is referred to by other frames has large effect upon the picture quality. The frame referred to by other frames can be the I picture or the P picture in the MPEG format, for example.

Figure 2A:
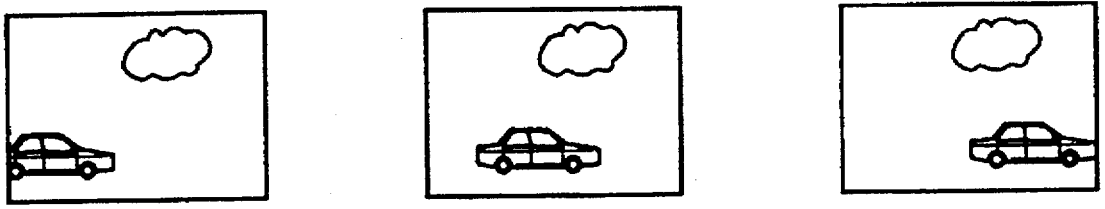
FIG. 2 is a diagram showing decoded images describing the second and third embodiments of the present invention.
Figure 2B:
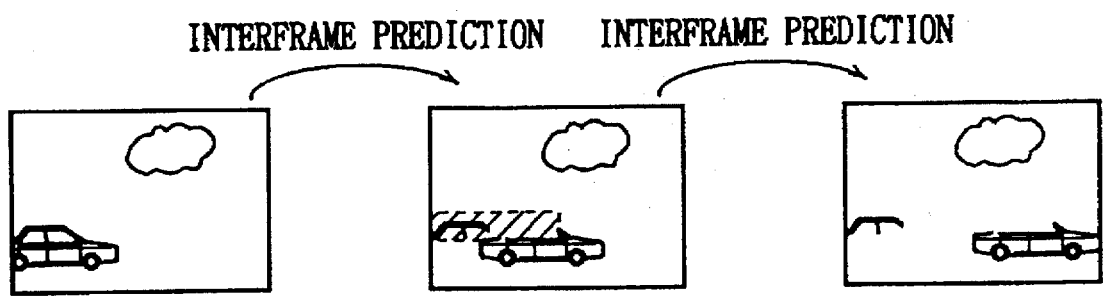
Figure 2C:
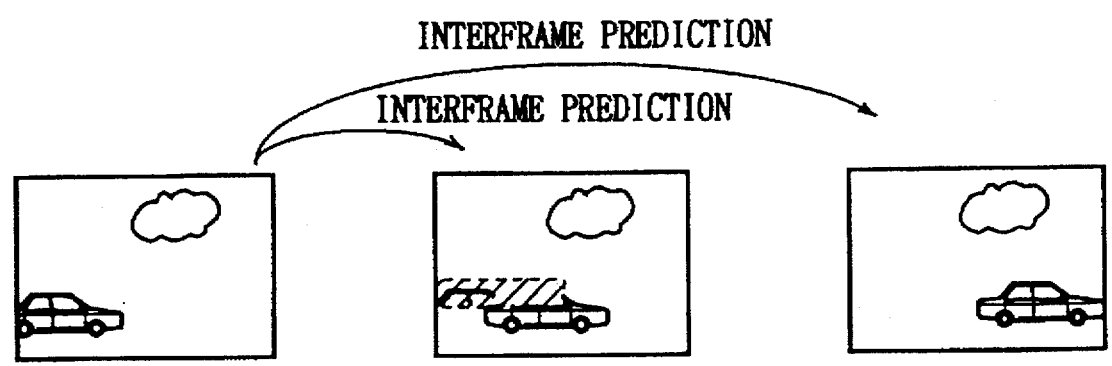

Deterioration in the picture quality of a frame that is referred to by other frames extends to the other frames. This is shown in FIG. 2. If an error occurs in the sequence of FIG. 2(a) and a part of the flame can not be decoded, that error affects not only the current frame but also extends to the next frame as shown in FIG. 2(b). In such a case, a request for retransmission of the data containing the error is sent and it is retransmitted until correctly received free from any error. If the current frame is a frame that is not referred to by other frames (the B picture in the MPEG format, for example), the deterioration in the picture quality of the current frame does not extend to other frames and it is detected only for a short time until the next frame is displayed, therefore a retransmission request is not transmitted.

Figure 4:
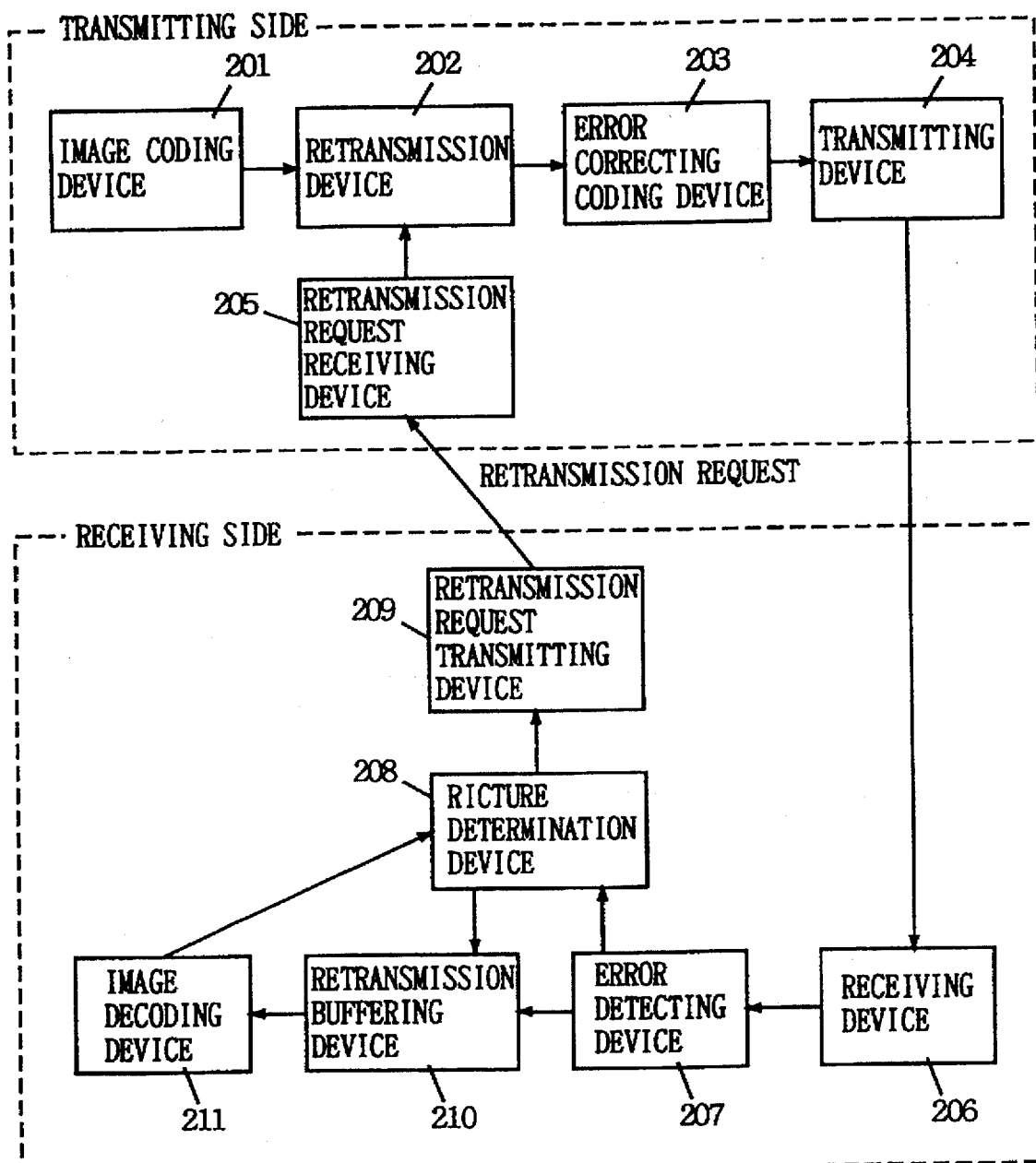
FIG. 4 is a block diagram showing the structure of the image data transmission system according to the second embodiment of the present invention.

FIG. 4 is a block diagram showing the structure of the image data transmission system according to the second embodiment of the present invention. In FIG. 4, the transmitting side includes an image coding device 201, a retransmission device 202, an error correcting coding device 203, a transmitting device 204 and a retransmission request receiving device 205. The receiving side includes a receiving device 206, an error detecting device 207, a picture determination device 208, a retransmission request transmitting device 209, a retransmission buffering device 210 and an image decoding device 211.

The operations of the image data transmission system shown in FIG. 4 will be described below.

First, on the transmitting side, the image coding device 201 compression-codes the inputted picture or image signals according to a method such as the CCITT recommendation H.261, the MPEG format, etc. to generate an image coded bit string. Next, the retransmission device 202 divides this bit string into data blocks with a plurality of bits and allots block numbers and outputs the same. The retransmission device 202 stores the outputted data blocks for a certain time in preparation for a retransmission request. Next, the error correcting coding device 203 performs error correcting coding to the respective data blocks from the retransmission device 202. Next, the transmitting device 204 transmits the image coded bit string outputted from the error correcting coding device 203 to the receiving side.

On the receiving side, the receiving device 206 receives the image coded bit string transmitted from the transmitting side. Next, the error detecting device 207 detects or corrects errors in the received signal for each data block. Data blocks with no errors detected, or with corrected errors pass through the retransmission buffering device 210 and they are decoded in the image decoding device 211. If an error which can not be corrected is detected, the picture determination device 208 determines the picture type (I picture, P picture or B picture) of the picture currently decoded in the image decoding device 211. If it is an I picture or a P picture, the retransmission request transmitting device 209 transmits a retransmission request of the data block containing the error to the transmitting side. Next, the compression-coded picture image data is sent in frame order with the header information of each frame including data indicating the type of picture of each frame. Then, the header information is first sent prior to the actual image data and is decoded in the image decoding device 211. Accordingly, the image decoding device 211 recognizes what type of picture is currently decoded, i.e., being received. The picture determination device 208 determines the type of picture on the basis of the result of the recognition of the image decoding device 211.

When the retransmission request receiving device 205 on the transmitting side receives the retransmission request from the receiving side, the retransmission device 202 makes a retransmission of the data block for which the retransmission request was transmitted. The retransmission buffering device 210 on the receiving side outputs received data blocks to the image decoding device 211 as they are if there is no data block being requested for retransmission. If any data block is being requested to be retransmitted, it buffers subsequent data blocks until that data block is retransmitted, and it correctly rearranges the order of the data blocks at the time when it is retransmitted and outputs them to the image decoding device 211. The image decoding device 211 decodes the data supplied from the retransmission buffering device 210 to generate the image.

Now, an image in the same location as an image frame preceding by one in time may be displayed for the portion which can not be correctly decoded because a retransmission request was not transmitted, or the entire image frame including the portion which can not be correctly decoded may be abandoned and the image frame preceding by one in time may be repeatedly displayed.

As described above, according to the second embodiment, retransmission is transmitted for errors with effects extending in time and retransmission is not sent for errors with effects not extending in time. It is therefore possible to make retransmission only for data of error portions having large effects on the image quality.

(3) Third Embodiment

Figure 5:
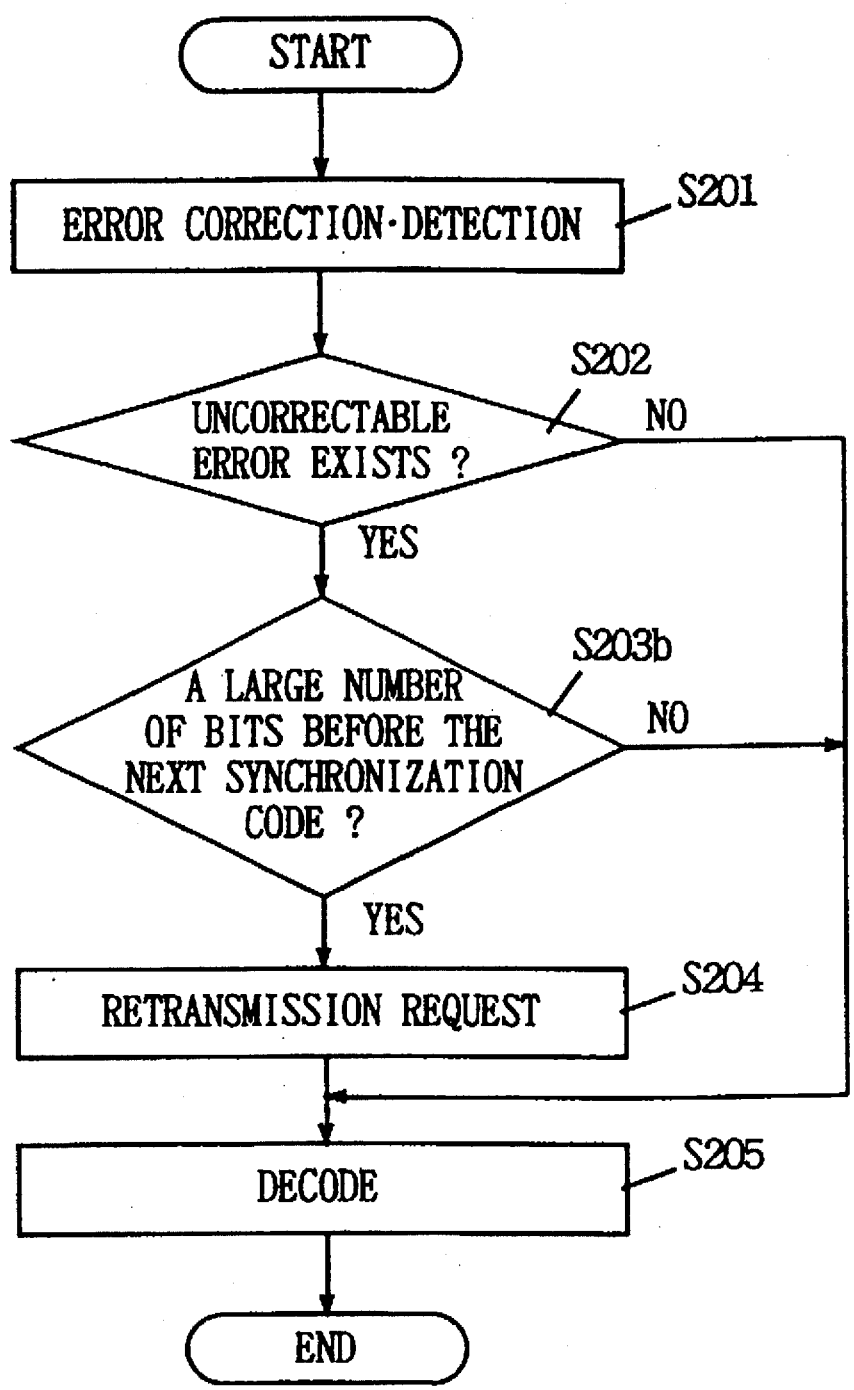
FIG. 5 is a flow chart describing the third embodiment of the present invention.

The third embodiment of the present invention considers the case where image signals are compression-coded on the transmitting side according to a coding in which an error occurring in a certain bit causes subsequent bits to be erroneously decoded on the receiving side (Huffman coding, such as H.261 or MPEG, for example). In this third embodiment, as shown in the flow chart of FIG. 5, the determination as to whether the effect of the error on the picture quality is large or small, as shown in step S203 of FIG. 1, is made on the basis as to whether the number of bits from the data with the error to the next synchronization code is larger or smaller than a predetermined threshold value (step S203b). Thus, in the third embodiment, when the number of bits is larger than the predetermined threshold value, it is determined that the picture quality is largely affected. The synchronization code is the GBSC in the H.261, or Slice Start Code in the MPEG format, for example.

Figure 2D:
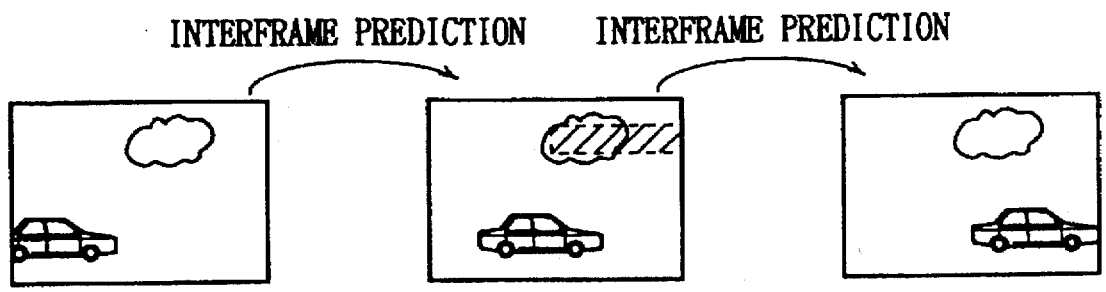

Even if an error occurs and segments of codes thereafter are lost, data following the next synchronization code can be correctly decoded. Accordingly, it is the data prior to the next synchronization code that can not be decoded because of the error. If the number of bits until the next synchronization code is small, it is determined that the difference from a reference frame is small as shown in FIG. 2(d), i.e., that the image in this portion is similar to that in the reference frame, and no retransmission request is transmitted for the error data, and the reference frame is displayed for the portion which can not be correctly decoded. In this case, the deterioration in the picture or image quality is not easy to detect. On the other hand, if the number of bits until the next synchronization code is large, it is determined that the difference from the reference frame is large as shown in FIG. 2(b), and a retransmission request is transmitted for the error data.

Figure 6:
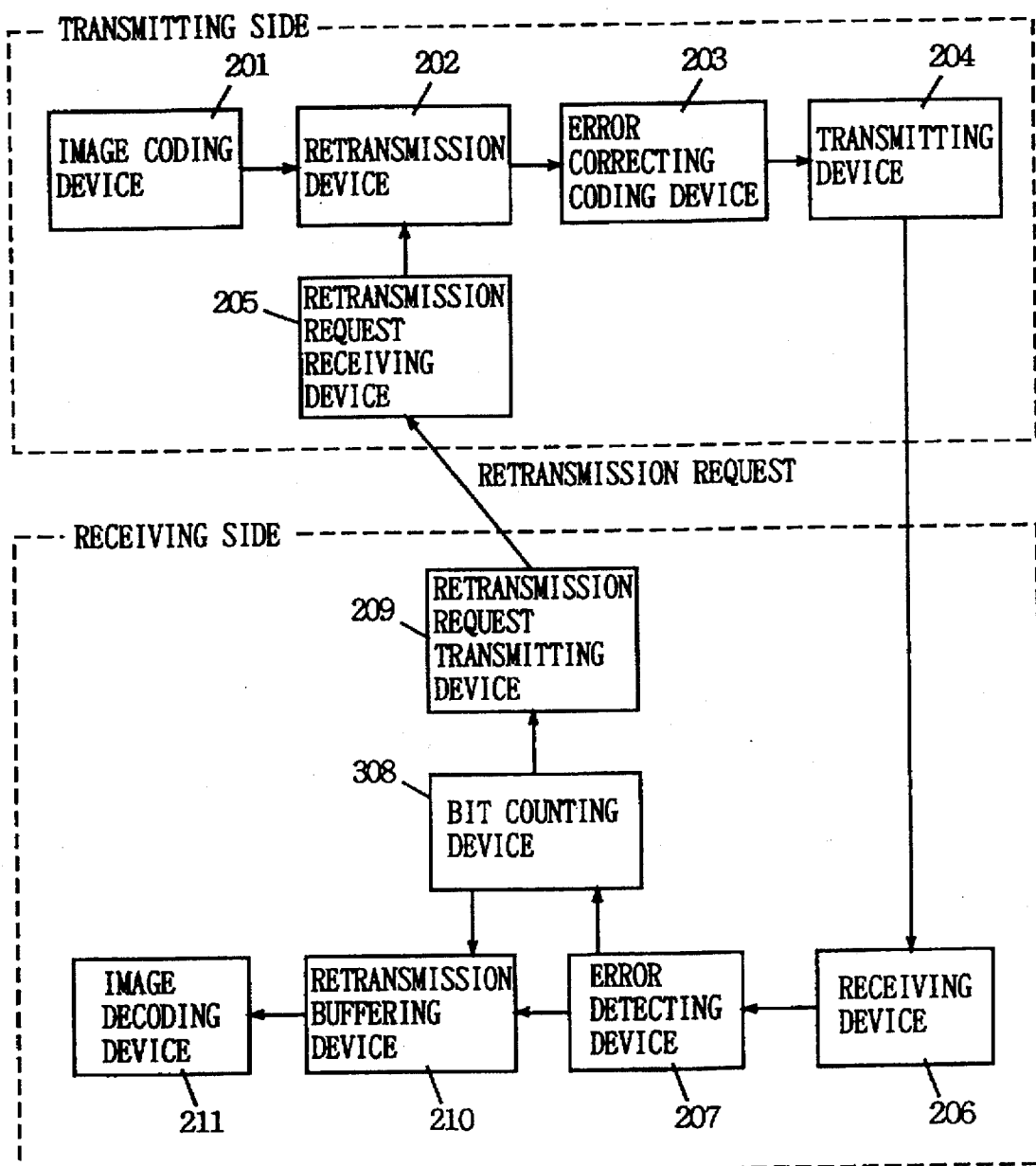
FIG. 6 is a block diagram showing the structure of the image data transmission system according to the third embodiment of the present invention.

FIG. 6 is a block diagram showing the structure of the image data transmission system according to the third embodiment of the present invention. In FIG. 6, the structure of the transmitting side is similar to that of the transmitting side in the image data transmission system of FIG. 4, where the same reference numerals are allotted to the corresponding portions. The structure of the receiving side is the same as that of the receiving side in the system of FIG. 4 where the same reference numerals are allotted to the corresponding portions, except that it is provided with a bit counting device 308 in place of the picture determination device 208.

The operation of the image data transmission system shown in FIG. 6 will now be described.

First, on the transmitting side, the image coding device 201 compression-codes inputted picture or image signals according to a method using the Huffman code such as H.261 or MPEG format to generated an image coded bit string. Other operations on the transmitting side are the same as the operations on the transmitting side in the image data transmission system of FIG. 4.

On the receiving side, the error detecting device 207 detects errors. If the error is uncorrectable, the bit counting device 308 detects a synchronization code appearing next and counts the number of bits appearing between the bit containing the error and the synchronization code. If the counted number of bits is larger than a predetermined threshold value, the retransmission request transmitting device 209 transmits a request for retransmission of the data block containing the error to the transmitting side. The threshold value may be determined to be a certain value considering the quantization step size, or may be variable depending on the size of the image region which can not be decoded correctly. The image decoding device 211 provides an image in the same location from a reference frame for displaying the portion which can not be correctly decoded because no retransmission request is transmitted. Other operations on the receiving side are the same as those on the receiving side in the image data transmission system of FIG. 4.

As discussed above, according to the third embodiment, retransmission is made for errors which are very easy to detect and retransmission is not made for errors which are not easy to detect. It is therefore possible to make retransmission only as to errors with large effects on the picture or image quality.

(4) Fourth Embodiment

Figure 7:
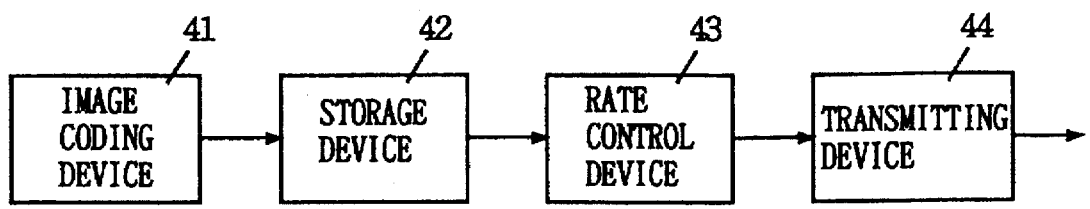
FIG. 7 is a block diagram showing the structure of the transmitting side in. the fourth embodiment of the present invention.

FIG. 7 shows the structure of the transmitting side in the fourth embodiment of the present invention. In FIG. 7, the transmitting side in this embodiment includes an image coding device 41, a storage device 42, a rate control device 43 and a transmitting device 44.

Figure 8:
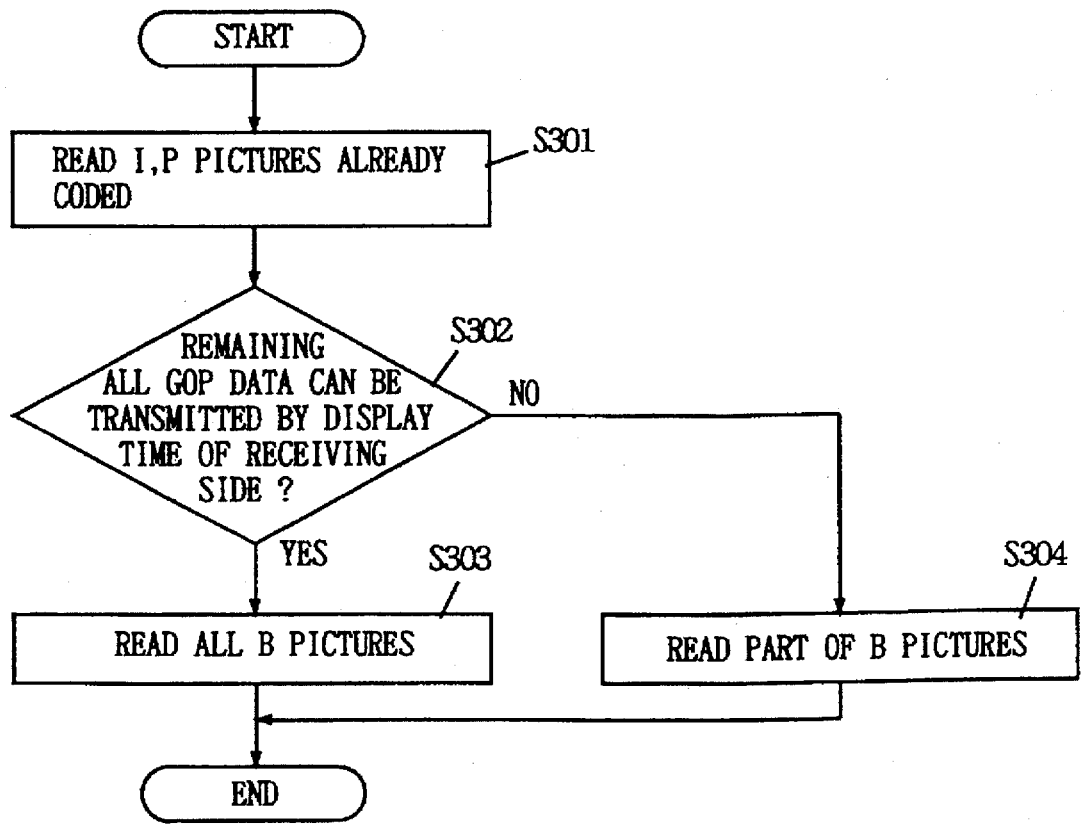
FIG. 8 is a flow chart describing the fourth embodiment of the present invention.

Next, the operation of the transmitting side shown in FIG. 7 is described. The image coding device 41 codes input data of dynamic images according to the MPEG format, which is stored in the storage device 42. As shown in the flow chart of FIG. 8, the rate control device 43 reads I pictures and P pictures that have already been coded from the storage device 42 (step S301) and makes a determination as to whether all the data of remaining GOP (Group of Pictures in the MPEG, which means a group of pictures including at least a piece of an I picture) can be transmitted before the time required to display each frame on the receiving side (step S302). If the transmission rate is high enough to transmit all the data of the GOP by the time required to display each frame on the receiving side, the rate control device 43 reads all the B pictures from the storage device step 42 (S303). On the other hand, if the transmission rate is low and all the data of the GOP can not be transmitted before the time required to display each frame on the receiving side, the rate control device 43 reads part of the B pictures from the storage device 42 (step S304). The I, P, B pictures read by the rate control device 43 are transmitted to the receiving side by the transmitting device 44. Thus, if the rate is low, transmission can be completed prior to the display time on the receiving side by thinning out B pictures.

As described above, according to the fourth embodiment, image data coded according to the MPEG format and stored can be transmitted according to the transmission rate without being re-decoded and coded. Accordingly, the structure of the transmitting side can be simple.

(5) Fifth Embodiment

Figure 9:
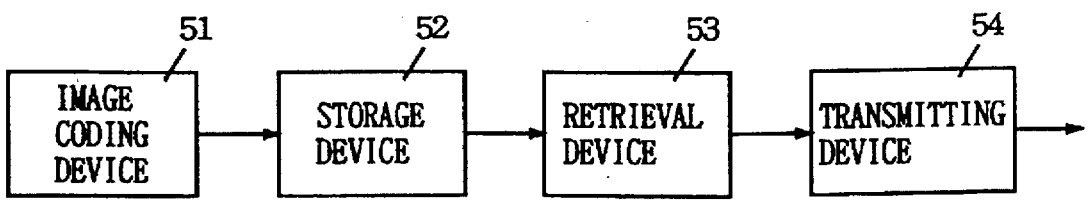
FIG. 9 is a block diagram showing the structure of the transmitting side in the fifth through eighth embodiments of the present invention.

FIG. 9 shows the structure of the transmitting side in the fifth embodiment of the present invention. In FIG. 9, the transmitting side in this embodiment includes an image coding device 51, a storage device 52, a retrieval device 53 and a transmitting device 54.

Figure 10:
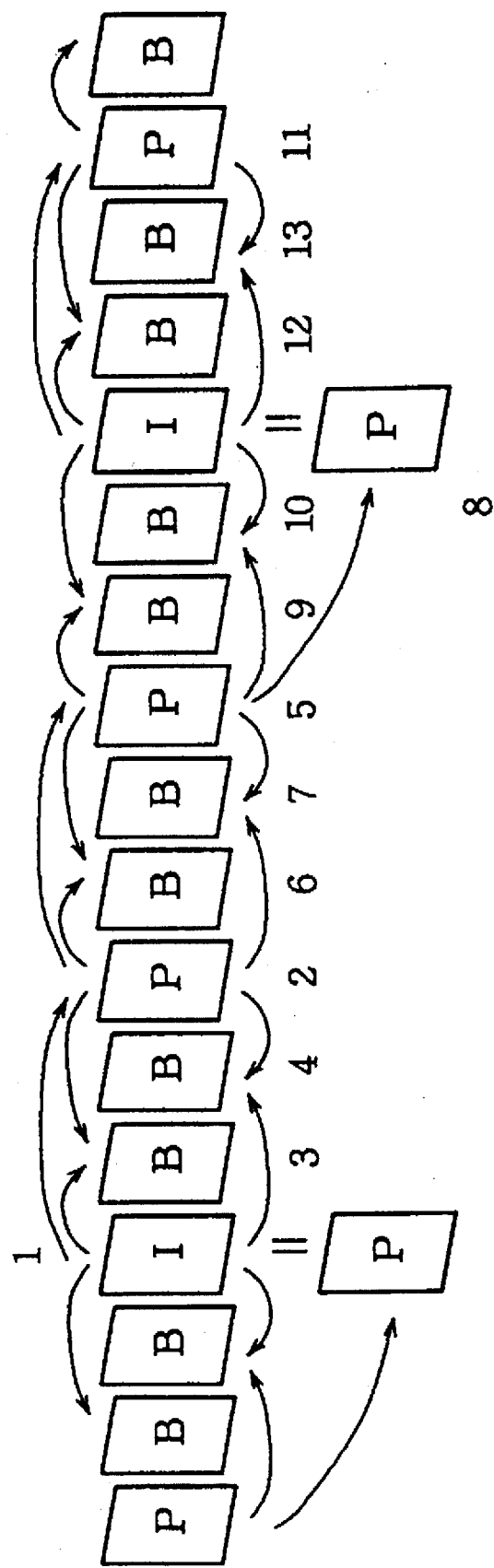
FIG. 10 is a sequence diagram describing the fifth embodiment of the present invention.
Figure 11:
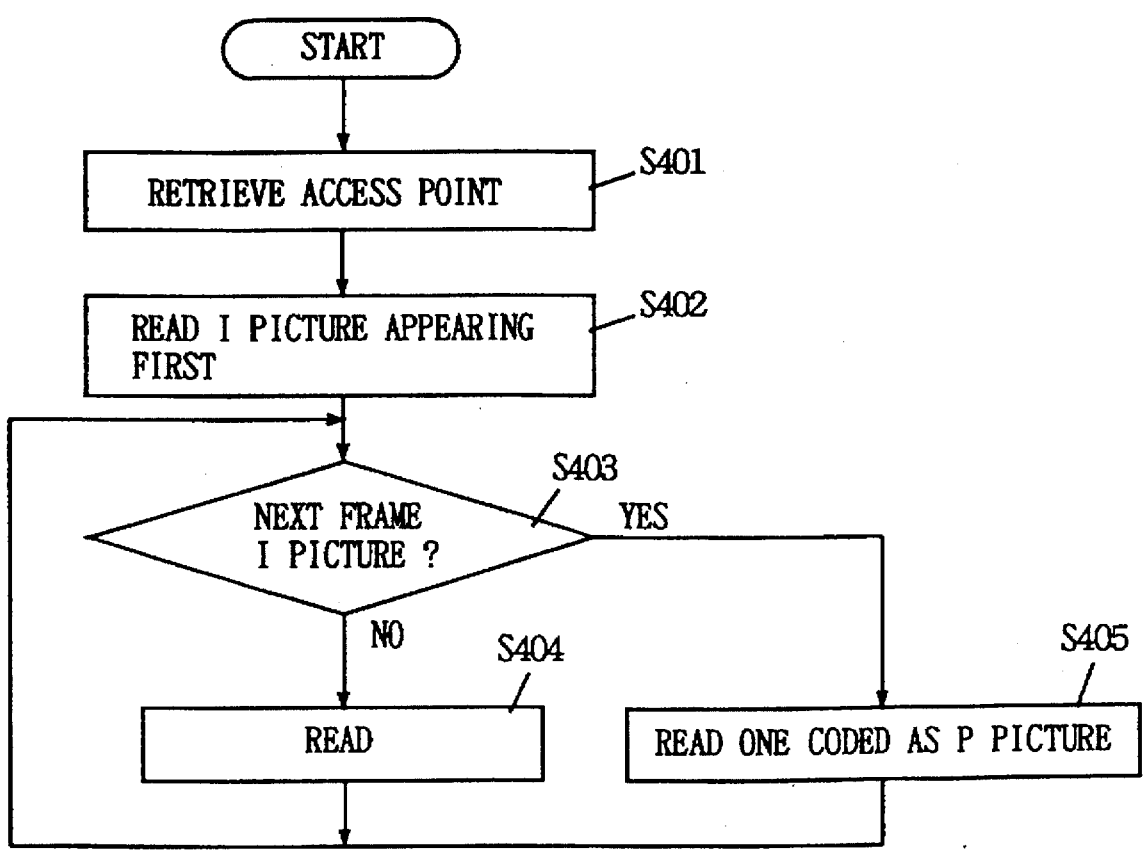
FIG. 11 is a flow chart describing the fifth embodiment of the present invention.

Next, the operation of the transmitting side shown in FIG. 9 is described. The image coding device 51 codes input dynamic image data by the MPEG format, which is stored in the storage device 52. At this time, as shown in FIG. 10, the image coding device 51 codes an image frame coded as an I picture also as a P picture which refers to an I picture or a P picture immediately before in time and stores it in the storage device 52. When a random access request is made from the receiving side, as shown in the flow chart of FIG. 11, the retrieval device 53 retrieves an access point from the data stored in the storage device 52 (step S401). Next, as shown by the figures in FIG. 10, the retrieval device 53 reads image frames in sequence from the I picture appearing first after the retrieved access point, where I pictures located in the middle are read as the ones coded as P pictures of those frames (steps S402–S405). The data read by the retrieval device 53 is transmitted to the receiving side by the transmitting device 54.

As described above, according to the fifth embodiment, the number of transmission bits can be considerably decreased while enabling random access because the I picture has a very large number of bits but the P picture has a small number of bits.

(6) Sixth Embodiment

Figure 12:
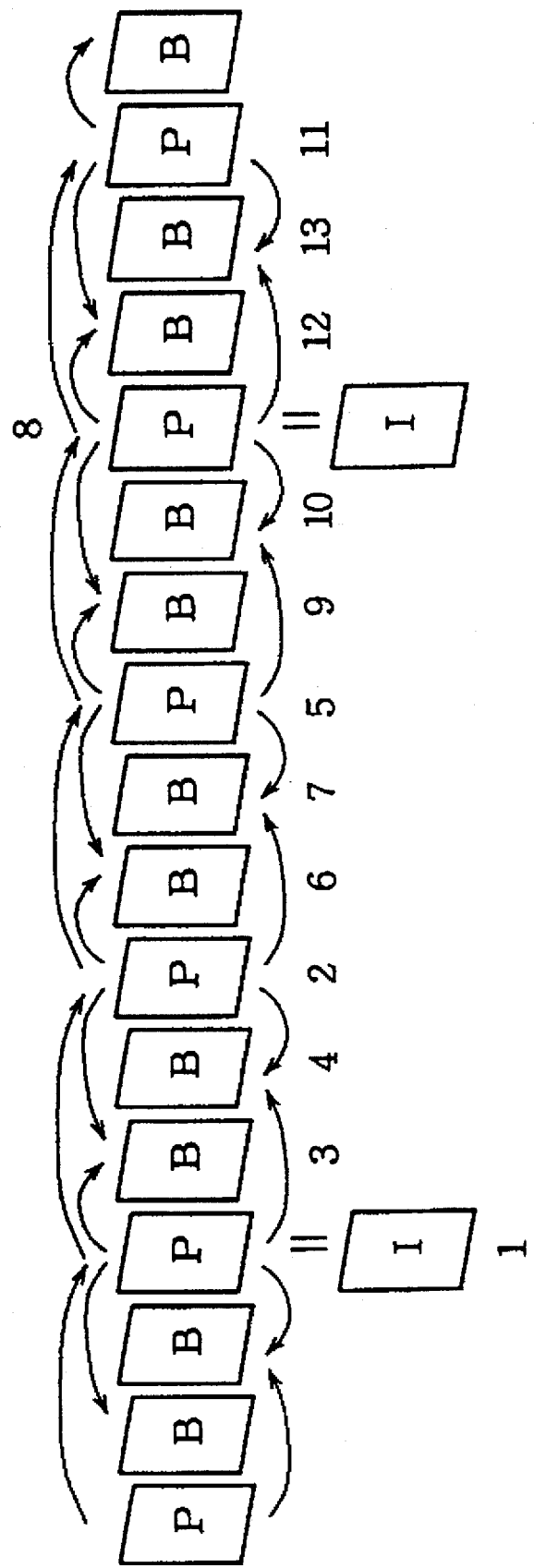
FIG. 12 is a sequence diagram describing the sixth embodiment of the present invention.
Figure 13:
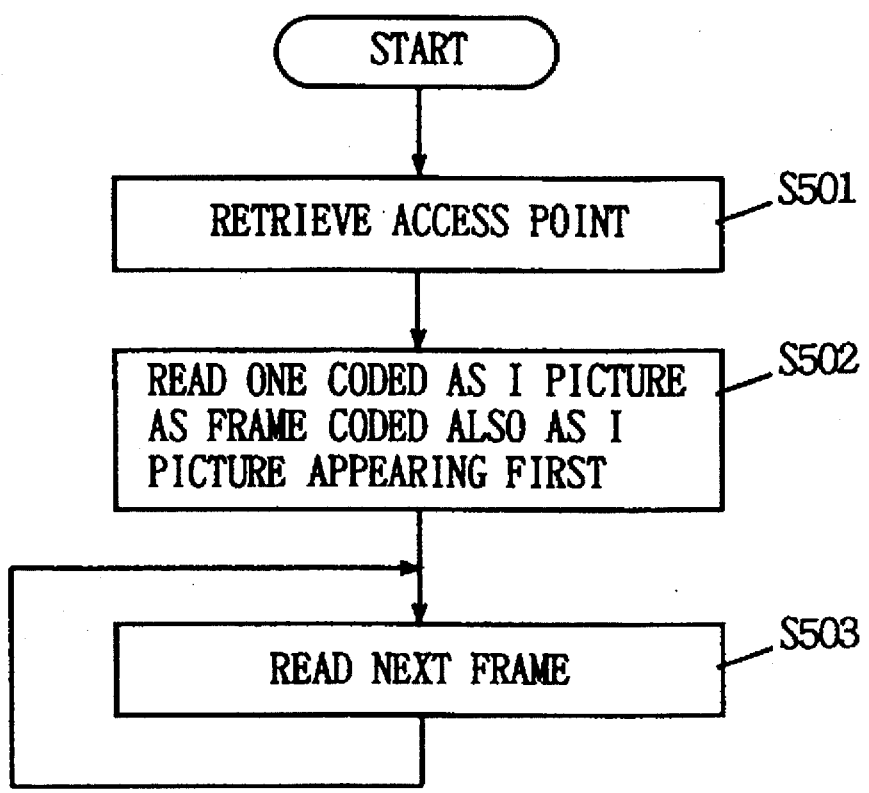
FIG. 13 is a flow chart describing the sixth embodiment of the present invention.

The structure of the transmitting side in the sixth embodiment of the present invention is the same as that in the fifth embodiment shown in FIG. 9. In this embodiment, the image coding device 51 codes each image frame as a P picture or a B picture with the exception of the first image frame and image frames appearing immediately after scene changes as shown in FIG. 12, and at this time, it codes image frames coded as P pictures also as I pictures to enable random access and have them stored in the storage device 52. When a random access request is made from the receiving side, the retrieval device 53 retrieves an access point from the data stored in the storage device 52 as shown in the flow chart of FIG. 13 (step S501). Next, the retrieval device 53 reads image frames from the I picture appearing first after the retrieved access point in order, as shown by the figures in FIG. 12. Now, the I picture is read only at the start and it is not read in the middle. The data read by the retrieval device 53 is transmitted to the receiving side by the transmitting device 54.

In the fifth embodiment described above, the error between the image coded as an I picture and the image of the same frame coded as a P picture is accumulated each time it appears. In the sixth embodiment, however, only the error related to the first frame remains and the errors after that are not accumulated. Furthermore, the error becomes almost undetectable by making the I picture as similar to the image coded as a P picture.

As described above, according to the sixth embodiment, the number of transmission bits can be considerably reduced while enabling random access, and further, the error can also be made small.

(7) Seventh Embodiment

Figure 14:
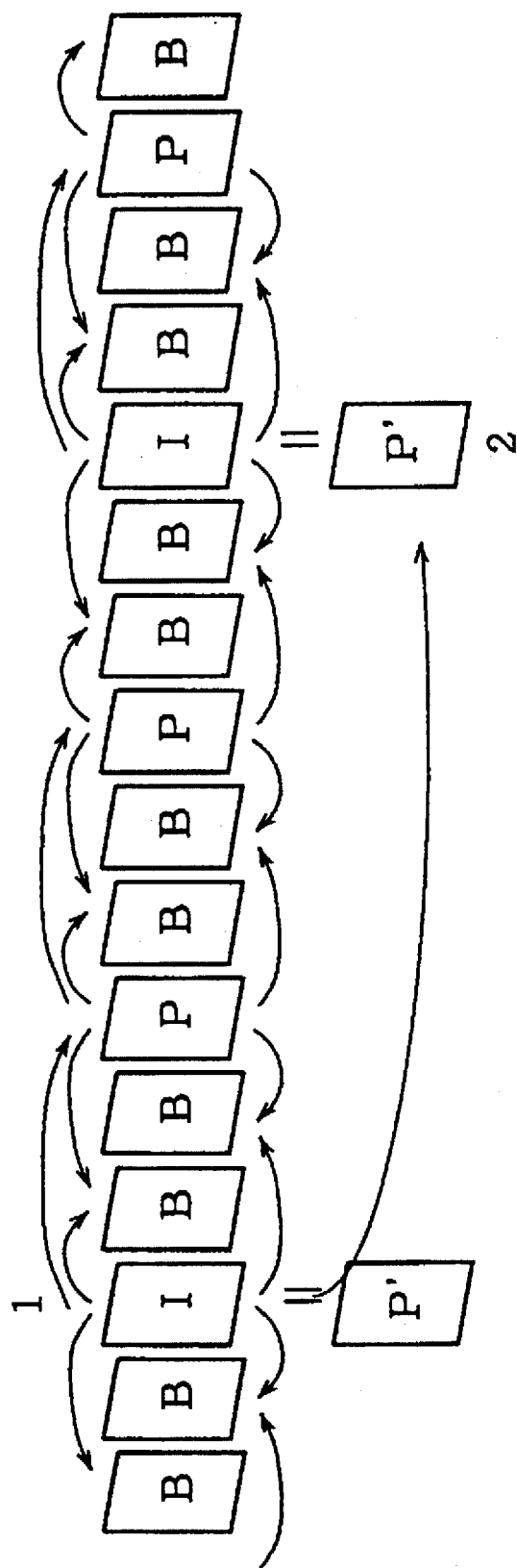
FIG. 14 is a sequence diagram describing the seventh embodiment of the present invention.
Figure 15:
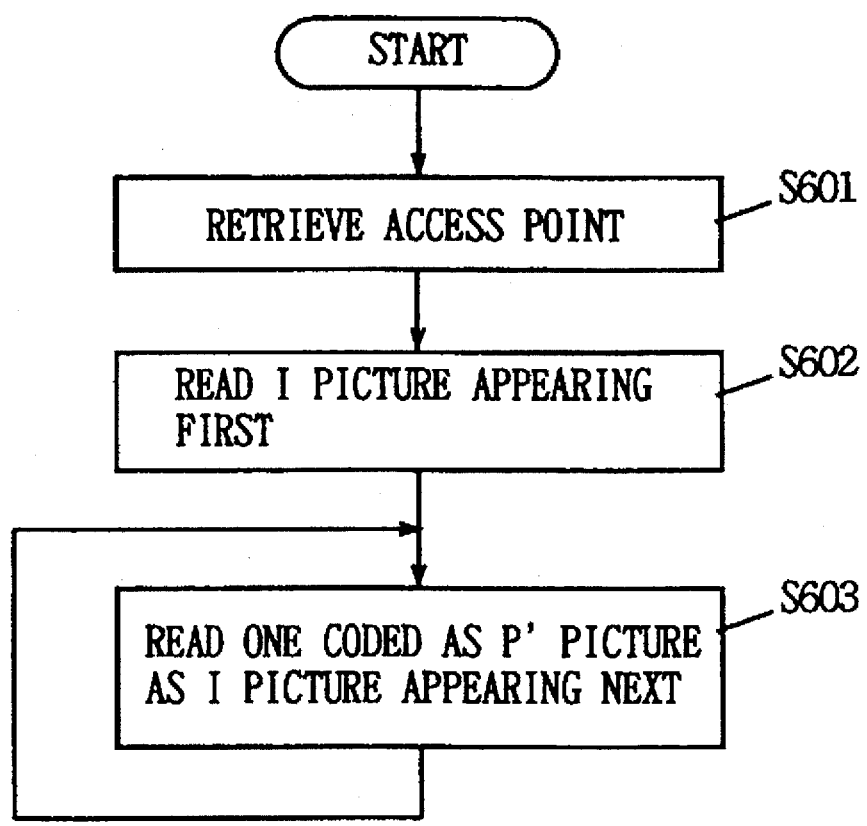
FIG. 15 is a flow chart describing the seventh embodiment of the present invention.

The structure of the transmitting side in the seventh embodiment of the present invention is the same as that in the fifth embodiment shown in FIG. 9. In this embodiment, as shown in FIG. 14, the image coding device 51 codes an image frame coded as an I picture also as a P picture which refers to an image frame coded as an I picture immediately before it in time (hereinafter, called PI picture) and have the same stored in the storage device 52. When a high-speed reproduction request is made from the receiving side, as shown in the flow chart of FIG. 15, the retrieval device 53 retrieves an access point from the data stored in the storage device 52 (step S601). Next, as shown by the figures in FIG. 14, the retrieval device 53 first reads the I picture appearing first after the retrieved access point (step S602), and after that, it retrieves only image frames coded as I pictures, and reads ones coded as P' pictures as to those frames (step S603). The data read by the retrieval device 53 is transmitted to the receiving side by the transmitting device 54.

Although the P' picture is coded such that it refers to the I picture immediately before in the seventh embodiment described above, coding the P' picture as referring to the P' picture immediately before it does not cause errors to accumulate because of the same reason as in the sixth embodiment.

As discussed above, according to the seventh embodiment, as the number of transmission bits can be largely reduced, reproduction can be made at higher speeds.

(8) Eighth Embodiment

Figure 16:
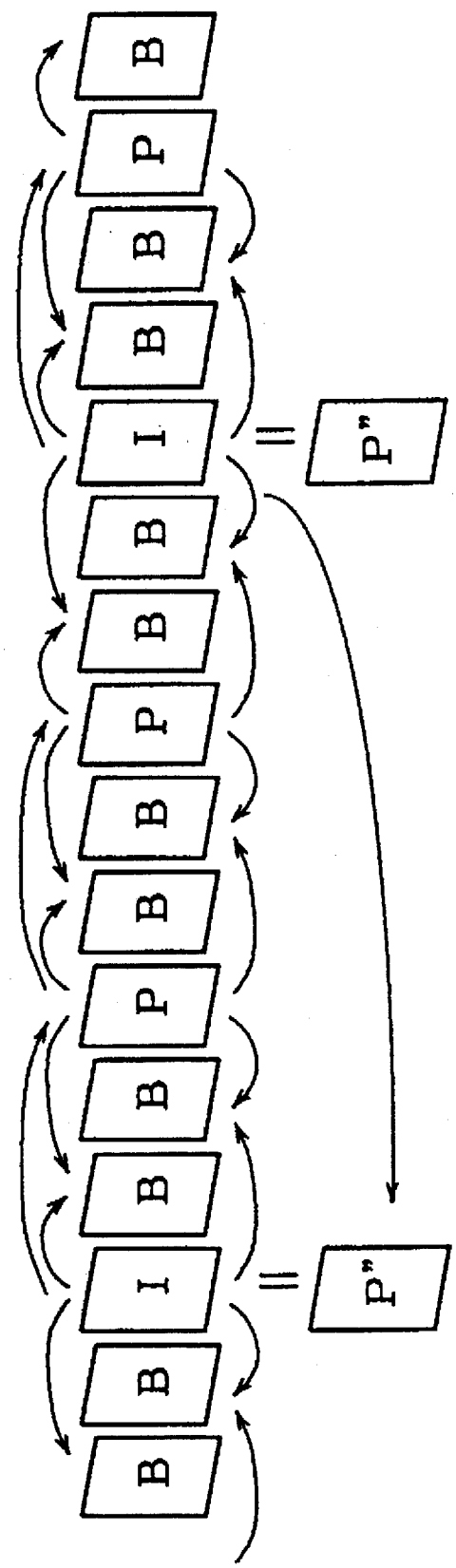
FIG. 16 is a sequence diagram describing the eighth embodiment of the present invention.
Figure 17:
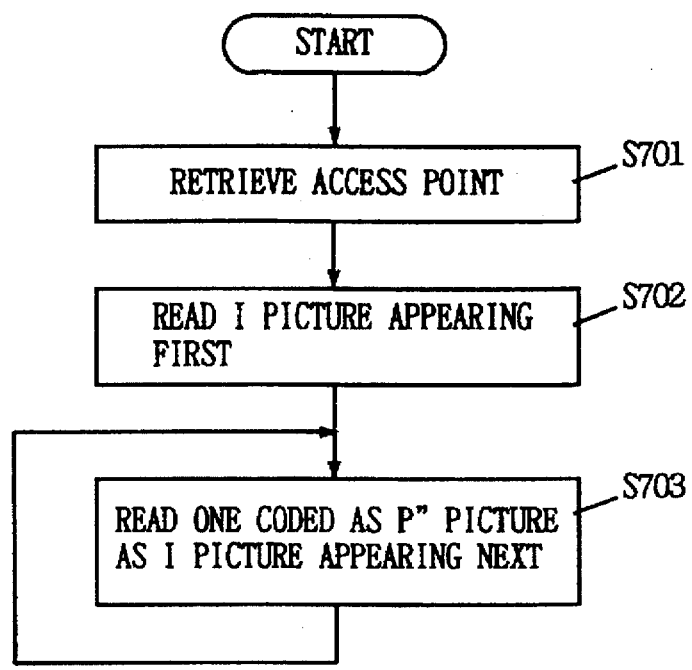
FIG. 17 is a flow chart describing the eighth embodiment of the present invention.
Figure 18:
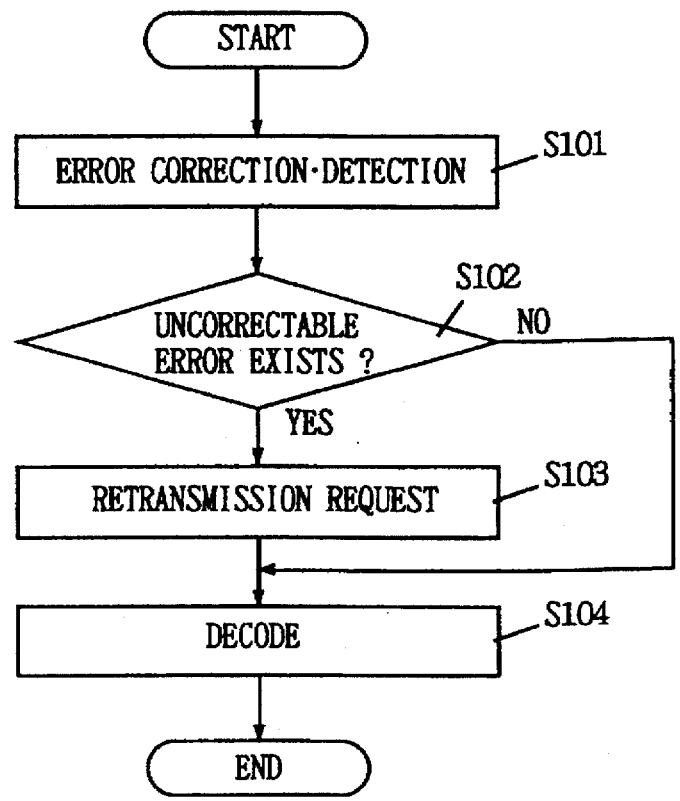
FIG. 18 is a flow chart describing the conventional image data transmission method.
Figure 19:
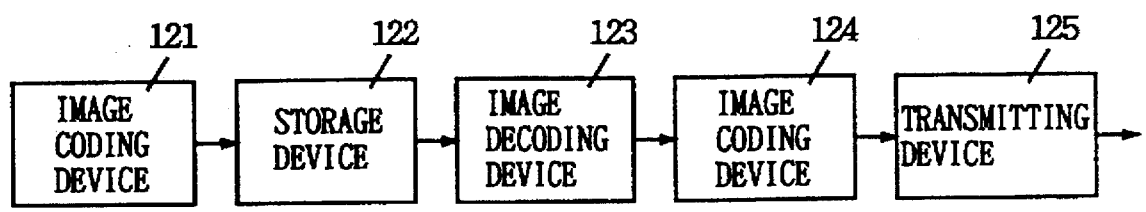
FIG. 19 is a block diagram describing the structure of the transmitting side in a conventional image data transmission system.

The structure of the transmitting side in the eighth embodiment of the present invention is the same as that in the fifth embodiment shown in FIG. 9. In this embodiment, as shown in FIG. 16, the image coding device 51 codes an image frame coded as an I picture also as a P picture which refers to an image frame coded as an I picture immediately after it in time (hereinafter, called PI" picture) and has the same stored in the storage device 52. When a reverse reproduction request is made from the receiving side, the retrieval device 53 retrieves an access point from the stored data (step S701) as shown in the flow chart of FIG. 17. Next, the retrieval device 53 reads the I picture appearing first after the retrieved access point (step S702), and after that, it reads in the reverse order from the GOP unit, wherein it reads the ones coded as P" pictures from image frames coded as I pictures (step S703). The data read by the retrieval device 53 is transmitted to the receiving side by the transmitting device 54. On the receiving side, they are decoded in the normal order for each GOP and held to be displayed in the reverse order.

When a reverse order high speed reproduction request is made from the receiving side, the retrieval device 53 retrieves an access point from the data stored in the storage device 52 and reads the I picture first, and after that, it retrieves only image frames coded as I pictures in the reverse order, reading the ones coded as P" pictures as those frames.

Although the P" picture is coded such that it refers to the I picture immediately after it in the above eighth embodiment, coding the P" picture as referring to the P'" picture immediately after it does not cause errors to accumulate because of the same reason as in the sixth embodiment.

As described above, according to the eighth embodiment, the number of transmission bits can be considerably reduced while enabling reverse reproduction. Furthermore, the reverse reproduction can be performed at high speeds.

While the present invention has been described in detail, the foregoing description is in all aspects illustrative and not restrictive. It is understood that numerous other modifications and variations can be devised without departing from the scope of the invention.

What is claimed is:

1. A method for transmitting compression-coded dynamic image data from a transmitting side to a receiving side, comprising the steps of:

the transmitting side compression-coding dynamic image signals to generate an image coded bit string, error-correcting coding or error-detecting coding the image coded bit string, and transmitting the image coded bit string to the receiving side, the receiving side detecting errors in the image coded bit string, determining whether an effect of detected errors on an image quality is larger than a predetermined criterion, and transmitting a retransmission request for data containing errors in the image coded bit string to the transmitting side only if the determined effect on the image quality is larger than said predetermined criterion, the transmitting side retransmitting the data containing errors in the image coded bit string, according to said retransmission request, to the receiving side when said retransmission request is transmitted from the receiving side, and the receiving side decoding the image coded bit string including the retransmitted data into an image.

2. The method for transmitting dynamic image data according to claim 1, wherein the receiving side transmits said retransmission request for data containing errors in the image coded bit string to the transmitting side when an image frame to which detected errors corresponds is referred to when other image frames are decoded, and does not transmit said retransmission request to the transmitting side if the image frame to which detected errors corresponds is not referred to when other image frames are decoded.

3. The method for transmitting dynamic image data according to claim 2, wherein the transmitting side compression-codes the dynamic image signals according to an MPEG format to generate the image coded bit string, and the receiving side transmits said retransmission request for data containing errors in said image coded bit string to the transmitting side only if detected errors exist in an I picture or a P picture in the MPEG format, and the receiving side does not transmit said retransmission request to the transmitting side if detected errors exist in a B picture.

4. The method for transmitting dynamic image data according to claim 2, wherein the receiving side replaces a portion of an image frame, which can not be correctly decoded because said request for retransmission of the data containing errors in the image coded bit string was not transmitted, with a corresponding portion of another image frame preceding the image frame by one in time.

5. The method for transmitting dynamic image data according to claim 2, wherein the receiving side replaces the entirety of an image frame, including a portion of an image frame which can not be decoded correctly because said retransmission request for data containing errors in the image coded bit string was not transmitted, with another image frame preceding the replaced image frame by one in time.

6. The method for transmitting dynamic image data according to claim 1, wherein the transmitting side compression-codes the dynamic image signals using a coding method in which an error occurring in a certain bit of data causes the receiving side to erroneously decode subsequent bits of data to generate the image coded bit string, and the receiving side transmits said retransmission request for data containing errors in the image coded bit string to the transmitting side only when the number of bits from the bit of the data containing errors in the image coded bit string to an appearance of a next synchronization code is larger than a predetermined threshold value, and replaces a portion of an image frame, which can not be correctly decoded because said retransmission request for data containing errors in said image coded bit string was not transmitted, with a corresponding portion of another image frame at the same position of a reference frame.

7. A system for transmitting compression-coded dynamic image data from a transmitting side to a receiving side, wherein said transmitting side comprises, image coding means for compression-coding dynamic image signals according to an MPEG format to generate an image coded bit string, retransmitting means for dividing said image coded bit string into data blocks and for performing retransmission processing of said data blocks requested for retransmission from said receiving side, error correcting coding means for error correcting coding or error detecting coding said data blocks of said image coded bit string, and transmitting means for transmitting said image coded bit string to said receiving side, and said receiving side comprises, receiving means for receiving said image coded bit sting, error detecting means for correcting or detecting errors for each said data block of said received image coded bit string, picture determination means for determining a type of picture for bits of said data blocks containing errors in said image coded bit string, retransmission requesting means for transmitting a retransmission request for data blocks containing errors in said image coded bit string to said transmitting side if said determined type of picture determined by said picture determination means is an I picture or a P picture in the MPEG format, buffering means for buffering subsequent received data blocks from a time when said retransmission request is transmitted until a time when said data blocks containing errors in said image coded bit string are retransmitted, and image decoding means for decoding said image coded bit string, including said data blocks containing errors which were retransmitted, into an image.

8. A system for transmitting compression-coded dynamic image data from a transmitting side to a receiving side, wherein said transmitting side comprises, image coding means for compression-coding said dynamic image signals using a coding method in which an error occurring in a certain bit of data causes said receiving side to erroneously decode subsequent bits of data to generate an image coded bit string, retransmitting means for dividing said image coded bit string into data blocks and for performing retransmission processing of said data blocks requested for retransmission from said receiving side, error correcting coding means for error-correcting coding or error-detecting coding said data blocks of said image coded bit string, and transmitting means for transmitting said image coded bit string to said receiving side, and said receiving side comprises, receiving means for receiving said image coded bit string, error detecting means for correcting or detecting errors for each said data block of said received image coded bit string, bit counting means for counting the number of bits from the bit of said data block of said received image coded bit string with said detected error to an appearance of a next synchronization code, retransmission requested means for transmitting a retransmission request for data blocks containing errors in said image coded bit string to said transmitting side if said counted number of bits is larger than a predetermined threshold value, buffering means for buffering subsequent data blocks from a time when said retransmission request is transmitted until a time when said data blocks containing errors in said image coded bit string are retransmitted, and image decoding means for decoding said image coded bit string, including said data blocks containing errors which were retransmitted, into an image and displaying said image in the same position of a reference frame in an image portion which can not be correctly decoded because said retransmission request for the data block containing errors in said image coded bit string was not transmitted.

9. An apparatus for transmitting compression-coded dynamic image data to a receiving side, comprising, image coding means for compression-coding dynamic image signals according to an MPEG format to generate an image coded bit string, storage means for storing said generated image coded bit string, rate control means for reading data stored in the MPEG format from said storage means with the reading of B pictures occurring so as to selectively skip various B pictures depending on a desired transmission rate, and transmitting means for transmitting said image coded bit string read by said rate control means to said receiving side.

10. An apparatus for transmitting compression-coded dynamic image data to a receiving side, comprising, image coding means for compression-coding dynamic image signals according to an MPEG format, coding an image frame coded as an I picture also as a P picture which refers to an I picture or a P picture appearing immediately before the image frame in time, to generate an image coded bit string, storage means for storing said generated image coded bit string, retrieval means for retrieving an access point from said image coded bit string stored in said storage means when a random access request is made from said receiving side, for reading said image coded bit string for each image frame in sequence starting from an I picture located first in time appearing after said access point, and for reading said image frame coded as a P picture of the same image frame as to an I picture appearing between said access point and said image frame coded as a P picture, and transmitting means for transmitting said image coded bit string read by said retrieval means to said receiving side.

11. An apparatus for transmitting compression-coded dynamic image data to a receiving side, comprising, image coding means for compression-coding dynamic image signals according to an MPEG format, coding image frames only as a P picture or a B picture with the exception of a first image frame and image frames appearing immediately after scene changes and coding such image frames coded as a P picture also as an I picture, to generate an image coded bit string, storage means for storing said generated image coded bit string, retrieval means for retrieving an access point from said image coded bit string stored in said storage means when a random access request is made from said receiving side and for reading said image coded bit string for each image frame in sequence starting from an I picture located first in time appearing after said access point, and transmitting means for transmitting said image coded bit string read by said retrieval means to said receiving side.

12. An apparatus for transmitting compression-coded dynamic image data to a receiving side, comprising, image coding means for compression-coding dynamic picture image signals according to an MPEG format, coding image frames coded as an I picture also as a P picture which refers to an image frame coded as an I picture appearing immediately before it in time, to generate an image coded bit string, storage means for storing said generated image coded bit string, retrieval means for retrieving an access point from said image coded bit string stored in said storage means when a high-speed reproduction request is made from said receiving side and reading an I picture appearing first in time after said access point, and retrieving only image frames coded as I pictures thereby reading the image frames coded as P pictures which refer to I pictures appearing immediately before it in time, and transmitting means for transmitting said image coded bit string read by said retrieval means to said receiving side.

13. An apparatus for transmitting compression-coded dynamic image data to a receiving side, comprising, image coding means for compression-coding dynamic image signals according to an MPEG format, coding image frames coded as an I picture also as a P picture which refers to an image frame coded as an I picture appearing immediately after it in time, to generate an image coded bit string, storage means for storing said generated image coded bit string, retrieval means for retrieving an access point from said image coded bit string stored in said storage means when a reverse reproduction request is made from said receiving side and reading an I picture appearing first in time after said access point, and retrieving, in a reverse order, only image frames coded as I pictures thereby reading the image frames coded as P pictures which refer to I pictures appearing immediately after it in time, and transmitting means for transmitting said image coded bit string read by said retrieval means to said receiving side.

* * * * *